(12) United States Patent
Mochizuki et al.

(10) Patent No.: US 6,247,530 B1
(45) Date of Patent: Jun. 19, 2001

(54) AIR CONDITIONING APPARATUS FOR VEHICLE

(75) Inventors: Yoshinobu Mochizuki, Kariya; Nobuyasu Naito, Iwakura; Hiroshi Kanda; Tatsuo Tsunooka, both of Kariya; Takeshi Nakamura, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/366,105

(22) Filed: Aug. 2, 1999

(30) Foreign Application Priority Data

Aug. 25, 1998 (JP) .................................................. 10-239031

(51) Int. Cl.[7] ...................................................... B60H 1/00
(52) U.S. Cl. ............................ 165/204; 165/203; 165/42; 454/121; 454/156
(58) Field of Search ............................... 165/42, 43, 202, 165/203, 204; 237/12.3 A, 12.3 B; 454/126, 121, 156, 160

(56) References Cited

U.S. PATENT DOCUMENTS

| 4,460,036 | * | 7/1984 | Yoshimi et al. ...................... 165/203 |
| 4,482,009 | * | 11/1984 | Nishimura et al. ................... 165/203 |
| 4,791,981 | | 12/1988 | Ito . |
| 5,086,628 | * | 2/1992 | Hashimoto ........................ 165/203 X |
| 5,237,828 | * | 8/1993 | Kutsuna .............................. 165/43 X |
| 5,704,544 | * | 1/1998 | Samukawa et al. .............. 165/203 X |
| 5,775,407 | * | 7/1998 | Inoue ................................ 165/203 X |

FOREIGN PATENT DOCUMENTS

| 62-108010 | 7/1987 | (JP) . |
| 62-210115 | 9/1987 | (JP) . |
| 3-189225 | 8/1991 | (JP) . |
| 5-278448 | 10/1993 | (JP) . |

* cited by examiner

*Primary Examiner*—John K. Ford
*Assistant Examiner*—Ljiljana V. Ciric
(74) *Attorney, Agent, or Firm*—Harness, Dickey & Pierce, PLC (57) ABSTRACT

In a vehicle air conditioning apparatus where temperature of air blown toward a front seat side and temperature of air blown toward a rear seat side of the passenger compartment are independently controlled, a switching door for generally partitioning a downstream warm air passage of a heater core into first and second air passages is disposed at an air outlet side of the heater core. When heating capacity for the front seat side of the passenger compartment is necessary to be increased, the switching door is operated to a rear shutting position so that all air heated by the heater core can be introduced toward the front seat side through the first and second air passages of the warm air passage.

18 Claims, 3 Drawing Sheets

AIR CONDITIONING APPARATUS FOR VEHICLE

CROSS-REFERENCE TO RELATED APPLICATION

This application is related to and claims priority from Japanese Patent Application No. Hei. 10-239031 filed on Aug. 25, 1998, the contents of which are hereby incorporated by reference.

BACKGROUND OF THE INVENTION

1. Field of the Invention:

The present invention relates to an air conditioning apparatus for a vehicle, which can independently control temperature of air blown toward a front seat side and temperature of air blown toward a rear seat side in a passenger compartment.

2. Description of Related Art:

In a conventional vehicle air conditioning apparatus, a single common heating heat exchanger is disposed in an air conditioning case, and a front air mixing door and a rear air mixing door are independently disposed so that temperature of air blown toward a front seat side and temperature of air blown toward a rear seat side of a passenger compartment are independently controlled. Further, a partition wall for partitioning a downstream air passage of the heating heat exchanger into a front air passage and a rear air passage is disposed on an air outlet side of the heating heat exchanger.

However, because the partition wall for partitioning the front air passage and the rear air passage is a fixed wall, the downstream air passage through which air having passed through the heating heat exchanger flows is always partitioned into the front air passage and the rear air passage. As a result, when a windshield of the vehicle is necessary to be quickly defrosted with maximum heating capacity during a defroster mode, air flowing through the rear air passage of the heating heat exchanger is not used for defrosting the windshield. Further, even when no passenger is on a rear seat of the passenger compartment, or even when air blown toward the rear seat is not necessary, the front air passage and the rear air passage are always partitioned from each other by the partition wall. Therefore, heating capacity for the front seat of the passenger compartment cannot be sufficiently effectively improved.

SUMMARY OF THE INVENTION

In view of the foregoing problems, it is an object of the present invention to provide an air conditioning apparatus for a vehicle, in which a downstream air passage of a heating heat exchanger can be partitioned into first and second passage portions so that temperature of air blown toward a front side and temperature of air blown toward a rear side in a passenger compartment can be independently controlled. In the air conditioning apparatus, heating performance for the front side of the passenger compartment can be improved by using air flowing through both of the first and second passage portions when it is necessary to increase heating capacity for the front side of the passenger compartment.

According to the present invention, in an air conditioning apparatus for a vehicle, a switching door for generally partitioning a downstream warm air passage of a heating heat exchanger into a first passage portion for a front seat and a second passage portion for a rear seat is disposed so that the first passage portion and the second passage portion are generally partitioned by the switching door. On the other hand, when heating capacity is necessary to be increased for the front side of the passenger compartment, the switching door is operated at a rear shutting position so that all air heated by the heating heat exchanger can be introduced toward the front side of the passenger compartment through both of the first and second passage portions. That is, in the present invention, the switching door can be used as a movable partitioning wall. Thus, the first and second passage portions of the heating heat exchanger can be generally partitioned from each other by the switching door, and temperature of air blown toward the front side and temperature of air blown toward the rear side of the passenger compartment can be independently controlled by first and second air mixing doors. Further, when heating performance is necessary to be increased for the front side of the passenger compartment, all air heated by the heating heat exchanger can be introduced toward the front side of the passenger compartment through the first and second passage portions of the warm air passage. Accordingly, even in the air conditioning apparatus having an independently temperature-control function, air blown toward the front side of the passenger compartment can be effectively heated.

Preferably, the second air mixing door for adjusting temperature of air blown toward the rear side of the passenger compartment closes a second bypass passage when the switching door is operated to the rear shutting position. Therefore, when the heating capacity for the front side of the passenger compartment is necessary to be increased, it can prevent air from being blown toward the rear side of the passenger compartment, so that the heating capacity for the front side of the passenger compartment can be improved by using an entire air-blowing capacity of a blower. For example, during a defroster mode, a windshield can be quickly defrosted in a short time.

More preferably, when air blown toward the rear side of the passenger compartment is not necessary, the switching door is operated to the rear shutting position. Therefore, when air blown toward the rear side of the passenger compartment is not necessary, air blown toward the front side of the passenger compartment can be effectively heated by using the entire capacity of the heating heat exchanger.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
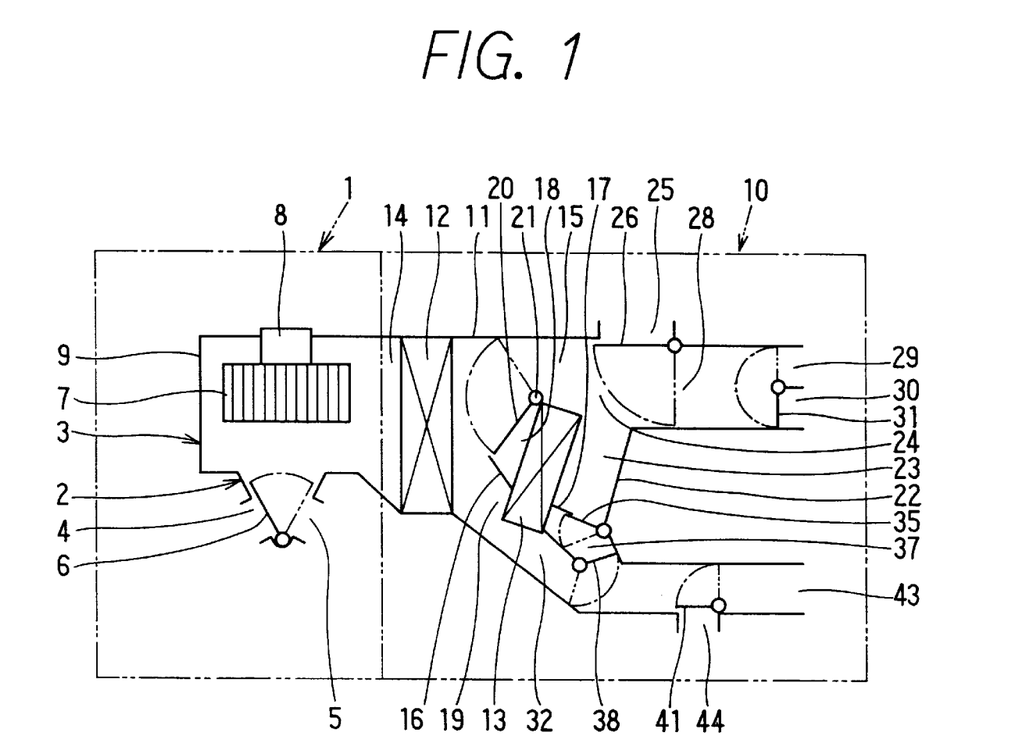
FIG. 1 is a schematic view showing a ventilation system of a vehicle air conditioning apparatus according to a first preferred embodiment of the present invention.

A first preferred embodiment of the present invention will be now described with reference to FIGS. 1–3. As shown in FIG. 1, an air conditioning apparatus for a vehicle includes a blower unit 1 and an air conditioning unit 10. In the first embodiment, the air conditioning unit 10 is disposed at an approximate center in a vehicle right-left direction, under an instrument panel in a passenger compartment of the vehicle. The blower unit 1 is disposed at an offset position to be shifted from the air conditioning unit 10 toward a front passenger's side in the vehicle right-left direction, for example.

The blower unit 1 has an inside/outside air switching box 2 and a blower 3. The inside/outside air switching box 2 includes an outside air introduction port 4 for introducing outside air (i.e., air outside the passenger compartment) and an inside air introduction port 5 for introducing inside air (i.e., air inside the passenger compartment). The outside air introduction port 4 and the inside air introduction port 5 are opened and closed by an inside/outside air switching door 6. The blower 3 for blowing air toward the air conditioning unit 10 includes a centrifugal fan 7 for blowing air, a driving motor 8 for driving the centrifugal fan 7, and a scroll case 9 for forming an air passage. The centrifugal fan 7 and the driving motor 8 are accommodated in the scroll case 9.

The air conditioning unit 10 includes an evaporator (i.e., cooling heat exchanger) 12 and a heater core (i.e., heating heat exchanger) 13 which are integrally accommodated in a single common air conditioning case 11. The air conditioning case 11 is made of resin which has an elasticity to some degree and is superior in a strength, such as polypropylene. The air conditioning case 11 is composed of plural division cases which are integrally connected by a fastening member such as a metal spring clip and a screw, after the evaporator 12 and the heater core 13 and components such as a door are accommodated therein.

Figure 2:
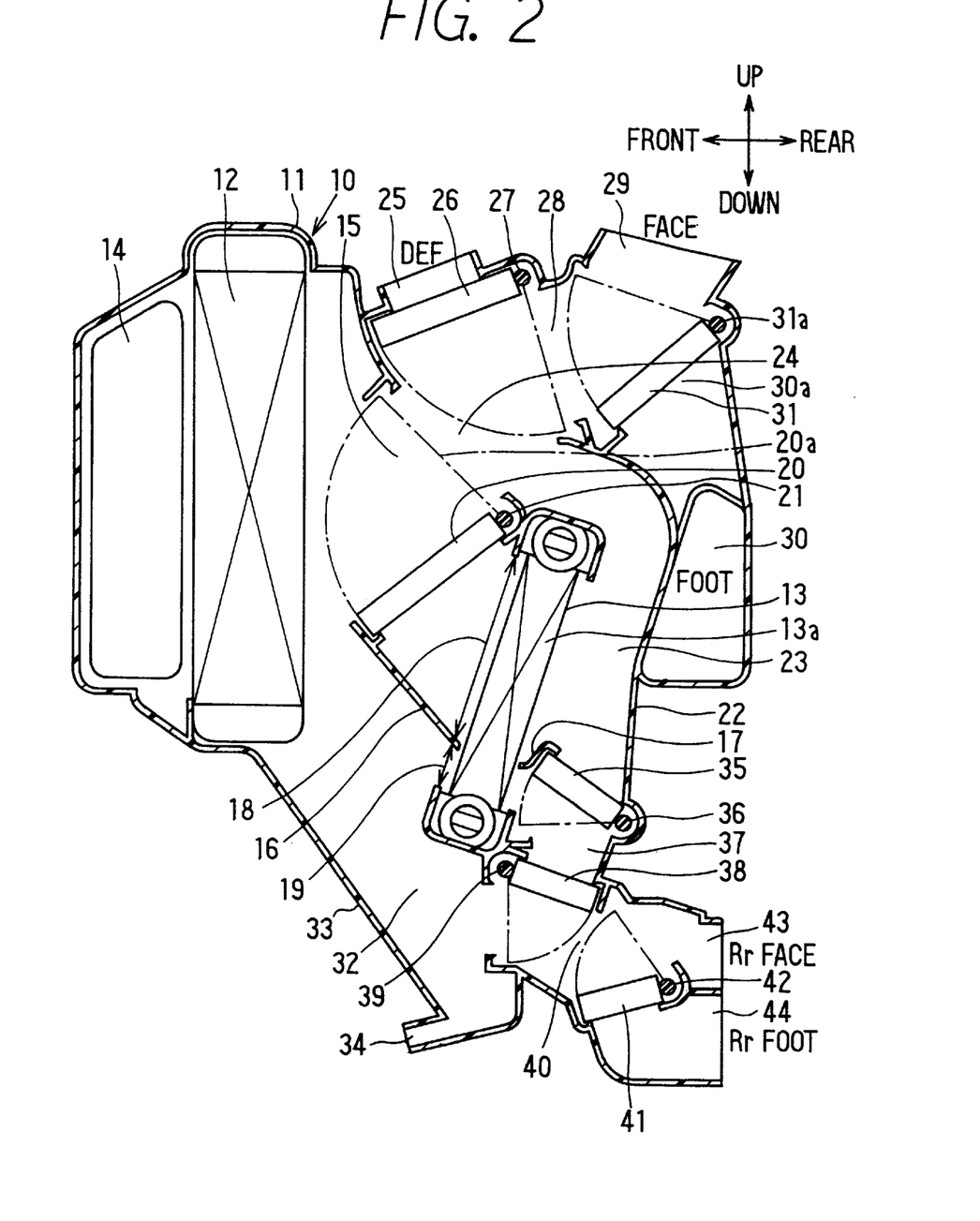
FIG. 2 is a schematic vertical sectional view showing an air conditioning unit of the air conditioning apparatus.

The air conditioning unit 10 is disposed at a lower side of the instrument panel in the passenger compartment, and is arranged as shown in FIG. 2 in a vehicle front-rear direction and in a vehicle up-down direction. An air inlet 14 into which air from the scroll case 9 of the blower unit 1 flows is provided in the air conditioning case 11 at a most vehicle front side.

The evaporator 12 is disposed within the air conditioning case 11 at an immediately downstream side of the air inlet 14. The evaporator 12 is thin in the vehicle front-rear direction, and is disposed in the air conditioning case 11 to cross an air passage in such a manner that a longitudinal direction thereof extends in the vehicle up-down direction. As being known well, the evaporator 12 cools air passing therethrough by absorbing an evaporation latent heat of refrigerant of a refrigerant cycle from the air.

A heater core 13 is disposed in the air conditioning case 11 on a downstream side of the evaporator 12 to form a predetermined distance between the evaporator 12 and the heater core 13. The heater core 13 is disposed on a lower side within the air conditioning case 11 to be inclined from the vehicle up-down direction toward a vehicle rear side. In the embodiment, each width dimension of the evaporator 12 and the heater core 13 in the vehicle right-left direction is approximately equal to a width dimension of the air conditioning case 11 in the vehicle right-left direction.

The heater core 13 heats air having passed through the evaporator 12 by using hot water (engine-cooling water) flowing therein as a heating source. A first cool air bypass passage 15 (front cool air bypass passage) through which air having passed through the evaporator 12 bypasses the heater core 13 is provided at an upper position of the heater core 13 within the air conditioning case 11. The first cool air bypass passage 15 is provided for a front seat side in the passenger compartment.

The heater core 13 includes a core portion 13a composed of plural flat tubes in which hot water flows and plural corrugated fins each of which is connected between adjacent flat tubes. An air passage through which air passes through the core portion 13a of the heater core 13 is partitioned by first and second partition walls 16, 17 into first and second air passages 18, 19. Each of the first and second partition walls 16, 17 extends in an entire width length of the air conditioning case 11 in the vehicle right-left direction, and is formed integrally with the air conditioning case 11. Therefore, the first and second air passages 18, 19 are partitioned by the first and second partition walls 16, 17 on upstream and downstream sides of the heater core 13.

A plate-shaped first air mixing door 20 for adjusting temperature of air blown toward a front seat side of the passenger compartment is disposed between the heater core 13 and the evaporator 12. The first air mixing door 20 adjusts a ratio between an amount of air passing through the first air passage 18 of the heater core 13 and an amount of air passing through the first cool air bypass passage 15 while bypassing the heater core 13. The first air mixing door 20 is integrally connected to a rotation shaft 21 disposed in a horizontal direction (i.e., vehicle right-left direction), and is rotated around the rotation shaft 21 in the vehicle up-down direction. By adjusting a rotation position of the first air mixing door 20, temperature of air blown toward the front seat side of the passenger compartment is adjusted.

The rotation shaft 21 of the first air mixing door 20 is rotatably held in the air conditioning case 11. One end of the rotation shaft 21 protrudes from the air conditioning case 11 toward an outside, and is connected to an actuator such as a servomotor through a link mechanism. The rotation position of the first air mixing door 20 is adjusted by the actuator.

A wall member 22 extending in the up-down direction is formed integrally with the air conditioning case 11 at a downstream side (vehicle rear side) of the heater core 13 to form a predetermined distance between the heater core 13 and the wall member 22. Therefore, a front warm air passage 23 extending upwardly from an immediately downstream side of the heater core 13 is defined by the wall member 22. A downstream air side (upper side) of the front warm air passage 23 and a downstream air side of the first cool air bypass passage 15 are joined in a first air mixing chamber 24 where cool air from the first cool air bypass passage 15 and warm air from the warm air passage 23 are mixed.

A defroster opening portion 25 is opened on an upper wall surface of the air conditioning case 11 at a vehicle front side so that conditioned air is introduced into the defroster opening portion 25 from the first air mixing chamber 24. The defroster opening portion 25 communicates with a defroster air outlet through a defroster duct, so that conditioned air is blown toward an inner surface of a windshield from the defroster air outlet.

The defroster opening portion 25 is opened and closed by a plate-like defroster door 26, and the defroster door 26 is rotated by a rotation shaft 27 disposed horizontally at a position proximate to the upper wall surface of the air conditioning case 11. The defroster door 26 is disposed to open and close the defroster opening portion 25 and a communication port 28. The communication port 28 is provided for introducing conditioned air from the first air mixing chamber 24 to a front face opening portion 29 and a front foot opening portion 30.

The front face opening portion 29 is provided on the upper wall surface of the air conditioning case 11 at a vehicle rear side from the defroster opening portion 25. The front face opening portion 29 communicates with a front face air outlet provided on an upper side of the instrument panel, through a front face air duct, so that conditioned air is blown toward an upper side of a passenger on a front seat of the passenger compartment.

The front foot opening portion 30 is provided on a lower side of the front face opening portion 29 in the air conditioning case 11, and is provided on right and left side surfaces of the air conditioning case 11. Air blown from the front foot opening portion 30 is blown toward the foot area of a passenger on the front seat of the passenger compartment.

The front face opening portion 29 and the front foot opening portion 30 are opened and closed by a plate-like foot/face switching door 31 disposed between both of the opening portions 29, 30. That is, the foot/face switching door 31 is rotated by a rotation shaft 31a to open and close the front face opening portion 29 and an inlet port 30a of the front foot opening portion 30. The defroster door 26 and the foot/face switching door 31 are operatively connected to an actuator such as a servomotor through a link mechanism, so that the defroster door 26 and the foot/face switching door 31 are operatively linked by the actuator.

On the other hand, a second cool air bypass passage 32 (rear cool air bypass passage) is provided on a lower side of the heater core 13 within the air conditioning case 11. Therefore, air having passed through the evaporator 12 passes through the second cool air bypass passage 32 while bypassing the heater core 13. A bottom wall surface of the air conditioning case 11, forming the second cool air bypass passage 32, has a slanting surface 33 slanting downwardly. Further, a draining pipe 34 is provided at a lowest position of the slanting surface 33, so that condensed water from the evaporator 12 is discharged to the outside of the air conditioning case 11 through the draining pipe 34.

A rear switching door 35 rotated by a rotation shaft 36 is disposed generally to face the second air passage 19 on a downstream air side of the heater core 13. Therefore, the rear switching door 35 switches a communication between the second air passage 19 of the heater core 13, and the front warm air passage 23 or a rear warm air passage 37. Air from the second air passage 19 of the heater core 13 is introduced into a lower downstream side of the air conditioning case 11 through the rear warm air passage 37. The rotation shaft 36 of the rear switching door 35 is connected to the actuator for driving a front air outlet mode door such as the defroster door 26 and the foot/face switching door 31, so that the rear switching door 35 is operatively linked with the defroster door 26 and the foot/face switching door 31.

Air from the rear warm air passage 37 and air from the second cool air bypass passage 32 are joined in a joining portion, and a second air mixing door 38 rotated by a rotation shaft 39 is disposed in the joining portion. The second air mixing door 38 adjusts an amount of air flowing from the rear warm air passage 37 and an amount of air flowing from the second cool air bypass passage 32, so that temperature of air blown toward a rear seat side of the passenger compartment is adjusted. That is, air from the rear warm air passage 37 and air from the second cool air bypass passage 32 is mixed in a second air mixing chamber 40 to have a predetermined temperature.

The rotation shaft 39 of the second air mixing door 38 is disposed horizontally in the vehicle right-left direction. One end of the rotation shaft 39 protrudes to an outside of the air conditioning case 11, and is connected to an actuator such as a servomotor. The rotation position of the second air mixing door 38 is adjusted by the actuator.

A plate-like rear mode switching door 41 is disposed on a downstream air side of the second air mixing chamber 40 to be rotated by a rotation shaft 42. The rear mode switching door 41 selectively opens and closes a rear face opening portion 43 and a rear foot opening portion 44. Therefore, air in the second air mixing chamber 40 flows toward the rear face opening portion 43 or the rear foot opening portion 44 selectively opened by the rear mode switching door 41. The rear face opening portion 43 communicates with a rear face air outlet through a connection duct, so that air is blown toward the upper side of a passenger on a rear seat of the passenger compartment. The rear foot opening portion 44 communicates with a rear foot air outlet through a connection duct, so that air is blown toward the lower side of the passenger on the rear seat of the passenger compartment.

The rotation shaft 42 of the rear mode switching door 41 is rotatably held in the air conditioning case 11. One end of the rotation shaft 42 protrudes to an outside of the air conditioning case 11, and is connected to an actuator through a link mechanism. Therefore, an operation position of the rear mode switching door 41 can be independently set by the actuator.

Figure 3:
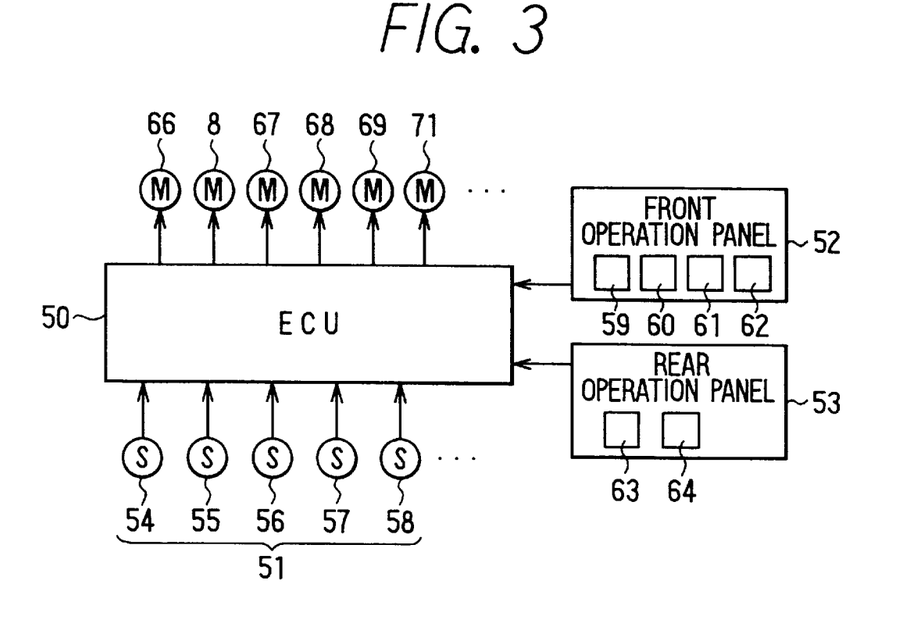
FIG. 3 is a block diagram of an electronic control unit (ECU) of the vehicle air conditioning apparatus according to the first embodiment.

FIG. 3 is a block diagram for controlling the air conditioning apparatus by using an electronic control unit (ECU) 50. Each component of the air conditioning apparatus is automatically controlled by the ECU 50. That is, the ECU 50 controls the blower unit 1 and the air conditioning unit 10 according to a pre-set program. When an engine ignition switch is turned on, electrical power is supplied from a vehicle battery to the ECU 50.

As shown in FIG. 3, sensor signals from a sensor group 51, operation signals from a front operation panel 52 provided in the instrument panel at a front side of the passenger compartment and from a rear operation panel 53 provided at a rear seat side in the passenger compartment are respectively input to the ECU 50. The sensor group 51 includes an outside air temperature sensor 54 for detecting a temperature of outside air (i.e., air outside the passenger compartment), an inside air temperature sensor 55 for detecting a temperature of inside air (i.e., air inside the passenger compartment), a sunlight sensor 56 for detecting an amount of sunlight entering the passenger compartment, an evaporator temperature sensor 57 for detecting a temperature of air cooled by the evaporator 15 (i.e., a temperature of air immediately after passing through the evaporator 12), and a water temperature sensor 58 for detecting a temperature of hot water flowing into the heater core 13.

On the front operation panel 52, a front seat side setting unit such as a front temperature setting unit 59, a front air amount setting unit 60, a front air outlet mode setting means or unit 61 and an inside/outside air mode setting unit 62 is provided. Similarly, on the rear operation panel 53, a rear seat side setting unit such as a rear temperature setting unit 63 and a rear air outlet mode setting unit 64 is provided. Further, a driving unit for driving each air conditioning equipment is controlled by the ECU 50. The driving unit includes a motor 66 for driving the inside/outside air selecting door 6 of the inside/outside air switching box 3, the motor 8 for driving the fan 7, a motor 67 for driving the first air mixing door 20, a motor 68 for driving the door 26, 31, 35, a motor 69 for driving the second air mixing door 38, and a motor 70 for driving the rear mode switching door 41.

Next, operation of the air conditioning apparatus according to the first embodiment of the present invention will be now described. In the first embodiment, an air outlet mode for the air conditioning apparatus is selected by the defroster door 26 and the foot/face switching door 31.

(1) FACE AIR OUTLET MODE

When the face air outlet mode is set based on a signal from the front air outlet mode setting unit 61 or a calculated result in the ECU 50, the defroster door 26 is rotated to the solid line position in FIG. 2 to fully close the defroster opening portion 25 and to fully open the communication port 28. Further, the foot/face switching door 31 is rotated to the solid line position in FIG. 2 to fully close the inlet port 30a of the front foot opening portion 30. In this case, the rear switching door 35 is rotated to the solid line position (i.e., general position) in FIG. 2, so that the ventilation passage of the heater core 13 is partitioned into the first and second air passages 18, 19 on the downstream side of the heater core 13. Further, the rear mode switching door 41 is rotated to the solid line position in FIG. 2, so that the rear face opening portion 43 is fully opened and the rear foot opening portion 44 is fully closed.

At this time, when the first air mixing door 20 is rotated to the solid line position in FIG. 2 by control of the ECU 50, a maximum cooling is set so that the first air passage 18 of the ventilation passage of the heater core 13 is closed and the first cool air bypass passage 15 is fully opened. In this case, when the blower unit 1 and the refrigerant cycle are operated, air blown by the blower unit 1 flows into the air conditioning case 11 from the air inlet 14, and is cooled by the evaporator 12.

During the maximum cooling, air cooled by the evaporator 12 passes through the first cool air bypass passage 15 and the first air mixing chamber 24, flows toward the front face opening portion 29 through the communication port 28, and is blown toward the upper side of the passenger on the front seat of the passenger compartment from the front face opening portion 29.

On the other hand, when the second air mixing door 38 is rotated to the solid line position in FIG. 2 by the control of the ECU 50, the air flow in the second air passage 19 of the heater core 13 is closed, and the second cool air bypass passage 32 is fully opened. Therefore, air cooled by the evaporator 12 passes the second cool air bypass passage 32, and flows toward the rear face opening portion 43 after passing through the second air mixing chamber 40. Air in the rear face opening portion 43 is blown toward the upper side of the passenger on the rear seat of the passenger compartment.

When the first air mixing door 20 is operated from the solid line position (maximum cooling position) in FIG. 2 to a predetermined opening position to control temperature of air blown into the passenger compartment, air having passed through the evaporator 12 is introduced into the first cool air bypass passage 15 and the first air passage 18 of the heater core 13 in accordance with the rotation position of the first air mixing door 20. Air from the first cool air bypass passage 15 and air from the front warm air passage 23 are mixed in the first air mixing chamber 24 so that conditioned air having a predetermined temperature is obtained in the first air mixing chamber 24.

Similarly, when the second air mixing door 38 is operated from the solid line position in FIG. 2 to a predetermined opening position, a ratio between the amount of air from the second cool air bypass passage 32 and the amount of air from the rear warm air passage 37 is adjusted by the second air mixing door 38, so that temperature of air blown toward a rear upper side of the passenger compartment is adjusted. Thus, in the first embodiment, temperature of air blown toward the front seat side of the passenger compartment and temperature of air blown toward the rear seat side in the passenger compartment can be independently controlled by independently controlling the rotation positions of the first and second air mixing doors 16, 38, during the face air outlet mode.

(2) BI-LEVEL AIR OUTLET MODE

When the bi-level air outlet mode is set, the defroster door 26 is rotated to the solid line position in FIG. 2 to close the defroster opening portion 25, the foot/face switching door 31 is rotated to a predetermined opening position between the solid line position and the chain line position to open both of the front face opening portion 29 and the inlet port 30a of the front foot opening portion 30. Further, the rear switching door 35 is rotated to the solid line position (general position) in FIG. 2 so that the ventilation passage of the heater core 13 is partitioned into the first air passage 18 and the second air passage 19. Further, the rear mode switching door 41 is rotated from the solid line position to a predetermined opening position, so that both of the rear face opening portion 43 and the rear foot opening portion 44 are opened.

Because the bi-level mode is generally set in the intermediate season such as the spring and the autumn, the first air mixing door 20 is generally rotated to a predetermined opening position so that temperature of air blown into the passenger compartment is adjusted. Therefore, during the bi-level air outlet mode, conditioned air having a predetermined temperature is simultaneously blown toward both front upper and lower sides of the passenger compartment from both of the front face opening portion 29 and the front foot opening portion 30.

Further, by rotating the second air mixing door 38 to a predetermined opening position, conditioned air having a predetermined temperature is simultaneously blown toward both rear upper and lower sides of the passenger compartment from both of the rear face opening portion 43 and the rear foot opening portion 44. Thus, during the bi-level air outlet mode, air is simultaneously blown toward both upper and lower sides of the passenger compartment, on both of front seat side and rear seat side of the passenger compartment.

(3) FOOT AIR OUTLET MODE

When the foot air outlet mode is set, the defroster door 26 is rotated from the solid line position in FIG. 2 to an opening position to slightly open the defroster opening portion 25 and to greatly open the communication port 28. Further, the foot/face switching door 31 is rotated to the chain line position in FIG. 2 to close the front face opening portion 29 and to fully open the inlet port 30a of the front foot opening portion 30. In this case, the rear switching door 35 is rotated to the solid line position (general position) in FIG. 2, so that the ventilation passage of the heater core 13 is partitioned into the first air passage 18 and the second air passage 19. Further, the rear mode switching door 41 is rotated to the chain line position in FIG. 2, so that the rear face opening portion 43 is closed and the rear foot opening portion 44 is fully opened. At this time, when the first air mixing door 20 is operated to the chain line position 20a in FIG. 2, the maximum heating is set during the foot air outlet mode so that the first cool air bypass passage 15 is fully closed and the first air passage 18 of the ventilation passage of the heater core 13 is fully opened. During the maximum heating, air blown from the blower unit 1 is introduced into the air inlet 14, passes through the evaporator 12, and flows into the first air passage 18 of the heater core 13 to be heated by the heater core 13. Air heated in the heater core 13 passes through the front warm air passage 23 upwardly, and is introduced into the first air mixing chamber 24. Air in the first air mixing chamber 24 is introduced into the front foot opening portion 30 through the communication port 28, and is blown toward the foot area of a passenger on the front seat of the passenger compartment.

At this time, the rear air mixing door 38 is operated to the chain line position in FIG. 2, so that the second cool air bypass passage 32 is fully closed and the rear warm air passage 37 is fully opened. Therefore, air flowing through the second air passage 19 is heated in the heater core 13, flows toward the rear foot opening portion 44 after passing through the second air mixing chamber 40, and is blown toward the foot area of the passenger on the rear seat of the passenger compartment from the rear foot opening portion 44.

When the first air mixing door 20 and the second air mixing door 38 are operated respectively from the chain line positions to set opening portions, temperature of air blown toward a front lower side of the passenger compartment and temperature of air blown toward a rear lower side of the passenger compartment can be respectively independently controlled.

During the foot air outlet mode, a ratio of the air amount from the defroster opening portion 25 to the air amount from the front foot opening portion 30 is generally set to ⅖. However, by increasing the opening degree of the defroster opening portion 25, the ratio of the air amount from the defroster opening portion 25 to the air amount from the front foot opening portion 30 can be set to approximately ⅗. That is, by increasing the opening degree of the defroster opening portion 25, a foot/defroster air outlet mode can be set from the foot air outlet mode so that defrosting performance is improved.

(4) DEFROSTER AIR OUTLET MODE

When the defroster air outlet mode is set by manually operating the mode setting unit 61 by a passenger, the defroster door 26 is rotated to the chain line position in FIG. 2 to fully open the defroster opening portion 25 and to close the communication port 28. When the defroster air outlet mode is set, the rear switching door 35 is operated by the ECU 50 from the solid line position (general position) in FIG. 2 to the chain line position in FIG. 2 with the selection of the defroster air outlet mode, so that the rear warm air passage 37 is fully closed by the rear switching door 35. Therefore, in this case, the second air passage 19 of the heater core 13 communicates with the front warm air passage 23. Simultaneously, when the defroster air outlet mode is set, the second air mixing door 38 is operated to the chain line position (maximum heating position) in FIG. 2 by the ECU 50 with the selection of the defroster air outlet mode, so that the second cool air bypass passage 32 is fully closed by the second air mixing door 38.

During the defroster air outlet mode, when the first air mixing door 20 is operated to the chain line position (the maximum heating position) in FIG. 2, all air blown from the blower unit 1 is heated by the heater core 13 in both of the first and second air passages 18, 19, and is blown toward the inner surface of the windshield after passing through the warm air passage 23 and the defroster opening portion 25.

As a result, even in an air conditioning apparatus where temperature of air blown toward the front seat side and temperature of air blown toward the rear seat side of the passenger compartment are independently controlled, when the defroster air outlet mode is set, the defrosting performance of the windshield can be improved in maximum by using the entire heating capacity of the heater core 13. Further, because the second air mixing door 38 fully closes the second cool air bypass passage 32 during the defroster air outlet mode, it can prevent cool air from flowing toward the rear seat side of the passenger compartment, and the defrosting performance of the windshield can be improved by using entire air-blowing capacity of the blower unit 1.

A second preferred embodiment of the present invention will be now described with reference to FIG. 4. In the above-described first embodiment, the rear switching door 35 is operatively connected to the actuator (i.e., motor 68) for driving the defroster door 26 and the foot/face switching door 31 through the link mechanism, so that the rear switching door 35 is operated to the chain line position in FIG. 2 when the defroster air outlet mode is selected. However, in the second embodiment, the rear switching door 35 is independently driven by an actuator respectively with the actuator (i.e., motor 68) for driving the defroster door 26 and the foot/face switching door 31.

Figure 4:
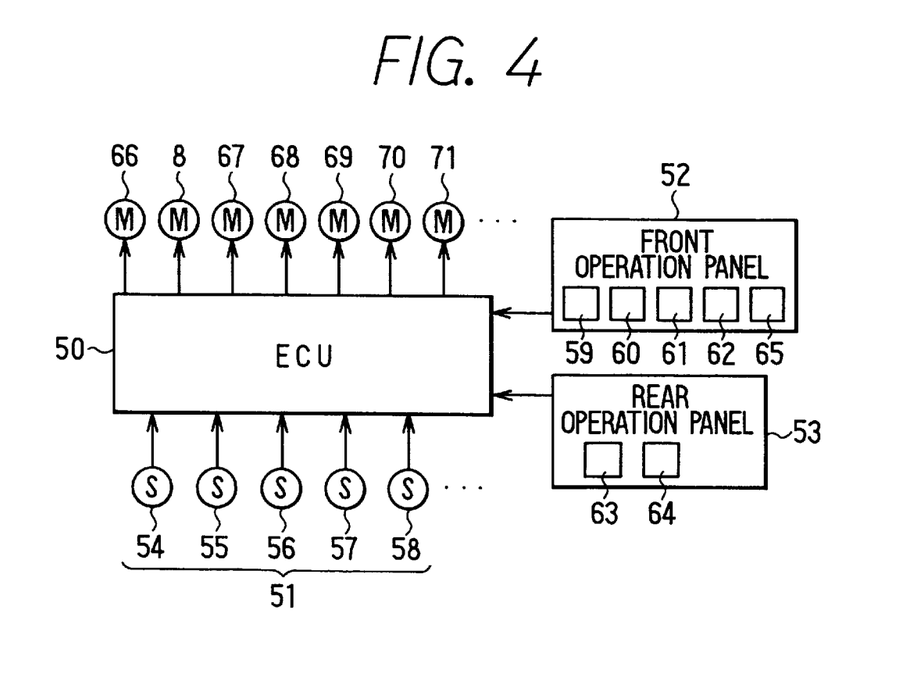
FIG. 4 is a block diagram of an electronic control unit (ECU) of a vehicle air conditioning apparatus according to a second preferred embodiment of the present invention.

As shown in FIG. 4, a rear shutting switch 65 is additionally provided on the front operation panel 52. The rear shutting switch 65 is operated, when no passenger is on the rear seat of the passenger compartment and air blown toward the rear seat of the passenger compartment is not necessary, or when the passenger on the rear seat of the passenger compartment does not want the blown-air. That is, when air blown toward the rear seat of the passenger compartment is not necessary, the rear shutting switch 65 is operated (e.g., turned on or off) by a passenger. Therefore, the rear switching door 35 is operated between the solid line position in FIG. 2 and the chain line position in FIG. 2 based on the input signal from the rear shutting switch 65. Further, a motor 71 as an actuator is provided so that the rear switching door 35 is independently operated by the motor 71.

According to the second embodiment of the present invention, when the defroster air outlet mode is set, the rear switching door 35 is operated to the chain line position in FIG. 2, and the second air mixing door 38 is rotated to the chain line position (maximum heating position) in FIG. 2, respectively. In addition, when air blown toward the rear seat of the passenger compartment is not necessary, the rear shutting switch 65 is operated by a passenger so that the rear switching door 35 is operated to the chain line position in FIG. 2 and the second air mixing door 38 is operated to the chain line position in FIG. 2 based on the input signal from the rear shutting switch 65 by the ECU 50. Thus, for example, during the foot air outlet mode, when air blown toward the rear seat side of the passenger compartment is not necessary, the front lower side of the passenger compartment can be heated with the entire heating capacity of the heater core 13, heating performance for the front seat of the passenger compartment can be improved. In the second embodiment, the other portions of the air conditioning apparatus are similar to those in the first embodiment, and the explanation thereof is omitted.

Although the present invention has been fully described in connection with the preferred embodiments thereof with reference to the accompanying drawings, it is to be noted that various changes and modifications will become apparent to those skilled in the art.

For example, in the above-described embodiments, during the defroster air outlet mode or the foot air outlet mode, the rear switching door 35 and the second air mixing door 38 are operated to the chain line positions in FIG. 2, respectively, so that the second air passage 19 of the heater core 13 also communicates with the front warm air passage 23. Therefore, in this case, air blown toward the front seat side of the passenger compartment can be heated with the entire heating capacity of the heater core 13. However, in any one air outlet mode, the rear switching door 35 and the second air mixing door 38 may be operated from the solid line positions to the chain line positions in FIG. 2, respectively, when heating capacity for the front seat side of the passenger compartment is necessary preferentially increased.

Such changes and modifications are to be understood as being within the scope of the present invention as defined by the appended claims.

What is claimed is:

1. An air conditioning apparatus for a vehicle having a passenger compartment, said air conditioning apparatus comprising:

an air conditioning case for forming an air passage, said air conditioning case having a first opening portion for blowing air toward a front side of the passenger compartment and a second opening portion for blowing air toward a rear side of the passenger compartment, said first opening portion including a face opening through which air is blown toward a front upper side of the passenger compartment, a foot opening through which air is blown toward a front lower side of the passenger compartment, and a defroster opening through which air is blown toward an inner surface of a front windshield of the vehicle;

a cooling heat exchanger, disposed in said air conditioning case, for cooling air in said air passage;

a heating heat exchanger for heating air from said cooling heat exchanger, said heating heat exchanger being disposed in said air conditioning case to form first and second bypass passages through which air having passed through said cooling heat exchanger bypasses said heating heat exchanger and to form a warm air passage through which air flows after having passed through said heating heat exchanger;

a first air mixing door for adjusting a ratio between an amount of air passing through said first bypass passage and an amount of air passing through said heating heat exchanger in such a manner that air blown toward the front side of the passenger compartment from said first opening portion has a predetermined temperature;

a second air mixing door for adjusting a ratio between an amount of air from said second bypass passage and an amount of air from said warm air passage in such a manner that air blown toward the rear side of the passenger compartment from said second opening portion has a predetermined temperature;

a switching door for partitioning said warm air passage into a first passage portion for introducing air toward said face opening, said foot opening and said defroster opening of said first opening portion, and a second passage portion for introducing air toward said second opening portion;

a mode selecting member which is disposed to selectively open and close said face opening, said foot opening and said defroster opening to select any one of a face mode where said face opening is opened, a bi-level mode where both said face opening and said foot opening are opened, a foot mode where said foot opening is opened, and a defroster mode where said defroster opening is opened; and a control unit for controlling operation of said switching door in such a manner that both of said first and second passage portions of said warm air passage communicate with said first opening portion when said mode selecting member selects one of said defroster mode and said foot mode.

2. The air conditioning apparatus according to claim 1, wherein said second air mixing door closes and said second bypass passage when said mode selecting member selects one of said defroster mode and said foot mode.

3. The air conditioning apparatus according to claim 1, wherein:

said first opening portion includes a defroster opening for blowing air toward an inner surface of a windshield of the vehicle; and said switching door is operated to the rear shutting position when a defroster mode where air is blown toward the inner surface of the windshield is set.

4. The air conditioning apparatus according to claim 1, further comprising:

a driving unit for driving said switching door, wherein:

said control unit controls the operation of said switching door through said driving unit, wherein said control unit includes mode setting means for setting said defroster mode, and rear shutting instruction means which instruct that air blown from said second opening portion is not necessary; and said switching door is operated by said control unit through said driving unit so that both of said first and second passage portions of said warm air passage communicate with said first opening portion when air blown from said second opening portion is not necessary during said defroster mode.

5. The air conditioning apparatus according to claim 1, wherein:

said switching door is operated so that both of said first and second passage portions of said warm air passage communicate with said first opening portion only during said foot mode.

6. The air conditioning apparatus according to claim 1, wherein said switching door is operated so that both of said first and second passage portions of said warm air passage communicate with said first opening portion when air blown from said second opening portion is not necessary.

7. The air conditioning apparatus according to claim 1, wherein said switching door is a plate-shaped door rotated around a rotation shaft.

8. The air conditioning apparatus according to claim 1, wherein said switching door is disposed in said warm air passage to generally partition said first passage portion and said second passage portion.

9. The air conditioning apparatus according to claim 1, wherein said first air mixing door adjusts a ratio between an amount of air passing through said first bypass passage and an amount of air passing through said first passage portion of said warm air passage.

10. The air conditioning apparatus according to claim 1, wherein said first bypass passage is provided at one side of said heating heat exchanger and said second bypass passage is provided at the other side of said heating heat exchanger.

11. The air conditioning apparatus according to claim 1, wherein said control unit controls operation of said switching door in such a manner that both of said first and second passage portions of said warm air passage communicate with said first opening portion, only when said mode selecting member selects said defroster mode.

12. The air conditioning apparatus according to claim 1, wherein:

said heating heat exchanger includes a heat core in which air is heated; and said switching door is operated at a position of said heating heat exchanger outside of said heat core when said mode selecting member selects one of said foot mode and said defroster mode.

13. An air conditioning apparatus for a vehicle having a passenger compartment, said air conditioning apparatus comprising:

an air conditioning case defining an air passage, said air conditioning case having a first opening portion for blowing air toward a front side of the passenger compartment and a second opening portion for blowing air toward a rear side of the passenger compartment;

a cooling heat exchanger disposed in said air conditioning case for cooling air in said air passage;

a heating heat exchanger for heating air from said cooling heat exchanger, said heating heat exchanger being disposed in said air conditioning case to form first and second bypass passages through which air having passed through said cooling heat exchanger bypasses said heating heat exchanger and to form a warm air passage through which air flows after having passed through said heating heat exchanger;

a first air mixing door for adjusting a ratio between an amount of air passing through said first bypass passage and an amount of air passing through said heating heat exchanger in such a manner that air blown toward the front side of the passenger compartment from said first opening portion has a predetermined temperature;

a second air mixing door for adjusting a ratio between an amount of air from said second bypass passage and an amount of air from said warm air passage in such a manner that air blown toward the rear side of the passenger compartment from said second opening portion has a predetermined temperature; and a switching door which is disposed to generally partition said warm air passage into a first passage portion for introducing warm air toward said first opening portion and a second passage portion for introducing warm air toward said second opening portion, wherein:

said first opening portion includes a foot opening through which air is blown toward a front lower side of the passenger compartment and a defroster opening through which air is blown toward an inner surface of a vehicle windshield; and said switching door is operated at a predetermined position where both said first and second passage portions of said warm air passage communicate with said first opening portion when one of a foot mode where air is mainly blown toward the front lower side through said foot opening and a defroster mode where air is mainly blown toward the inner surface of the vehicle windshield through said defroster opening is set.

14. The air conditioning apparatus according to claim 13, wherein said second air mixing door closes said second bypass passage when said switching door is operated to the predetermined position.

15. The air conditioning apparatus according to claim 13, wherein said switching door is operated to the predetermined position only during the defroster mode.

16. The air conditioning apparatus according to claim 13, wherein said switching door is operated to the predetermined position only during the foot mode.

17. The air conditioning apparatus according to claim 13, wherein said switching door is operated to the predetermined position when air is blown from said second opening portion is not necessary.

18. The air conditioning apparatus according to claim 13, wherein said switching door is a plate member rotated around a rotation shaft.

* * * * *